Dec. 7, 1926.
C. W. WYMAN
1,609,637
CONTROLLING MECHANISM
Original Filed May 20, 1920
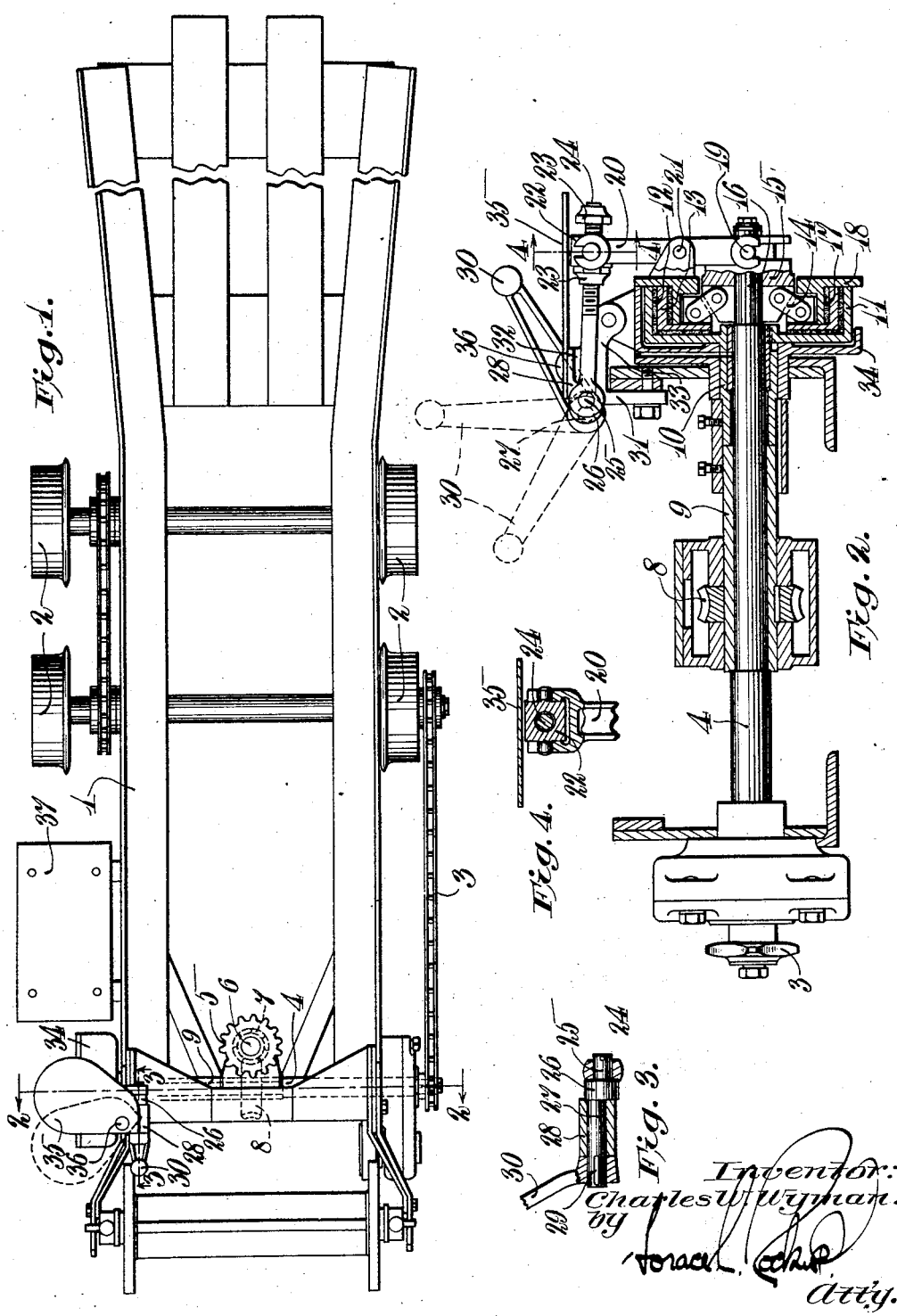

Patented Dec. 7, 1926.

1,609,637

UNITED STATES PATENT OFFICE.

CHARLES W. WYMAN, OF CLAREMONT, NEW HAMPSHIRE, ASSIGNOR TO SULLIVAN MACHINERY COMPANY, A CORPORATION OF MASSACHUSETTS.

CONTROLLING MECHANISM.

Application filed May 20, 1920, Serial No. 382,883. Renewed October 30, 1924.

My invention relates to controlling mechanism.

It has for its object to provide an improved controlling mechanism, and one which, while not necessarily limited thereto, is especially adapted to the control of combined cooperating mechanism adapted to be operated in sequence. A further object of my invention is to provide an improved controlling mechanism for combined clutch and brake mechanisms of the type used on mining machine trucks, the same including an improved, simplified, and rugged mechanism adapted to control the brake and clutch in the desired sequence and also adapted to be readily and conveniently operated by an operator. These and other advantages of my improved construction will, however, hereinafter more fully appear.

While my invention may be embodied in various forms, I have shown herein for purposes of illustration one embodiment which my invention may assume in practice, the same being illustrated in the accompanying drawings as applied to a mining machine truck.

In these drawings:

Fig. 1 is a plan view of a truck equipped with my improvement.

Fig. 2 is a transverse sectional view on line 2—2 of Fig. 1.

Fig. 3 is a detail sectional view on line 3—3 of Fig. 1.

Fig. 4 is a detail sectional view on line 4—4 of Fig. 2.

In this illustrative construction, I have shown a truck 1, which may be of any standard form, having its wheels 2 adapted to be driven through a power connection 3, herein in the form of a chain and sprocket drive, from a truck driving shaft 4 carried on the rear end of the truck and itself adapted to be driven from a truck supported mining machine (not shown) through a gear 5 rotatable by a rotating part on the mining machine, the connection between the gear 5 and the shaft 4 and the speed of rotation of the latter shaft being controlled through a usual brake and clutch mechanism in turn controlled by improved controlling mechanism hereinafter described.

More particularly, it will be observed that herein the gear 5 is carried on an upright shaft 6 which in turn carries a worm 7 meshing with a worm gear 8 rotatable on the transverse shaft 4, preferably at a point between its ends. As shown, this gear 8 is fixed to a sleeve 9 rotatable on the shaft 4, and this sleeve 9 is in turn fixed to a coaxial sleeve 10 of a clutch member 11 of usual form disposed at one end of the shaft, and herein having a usual clutch lining 12 therein carried by and pressed into engagement therewith by an inter coaxially disposed expansible clutch and brake member 13 which is in turn connected through toggles 14 with a longitudinally movable shipping member 15 splined, as at 16, to one end of the shaft 4. As shown, a brake lining 17 is also disposed coaxially with and within the member 13 and adapted to be pressed against an inner stationary abutment or coaxial brake member 18, carried on the frame, when the member 13 is moved away from the member 11, i. e., when the member 15 is moved longitudinally to the right from the position shown in Fig. 2. Herein, the member 15 is also provided with the usual lugged collar 19 adapted to be engaged by the forked ends of an upstanding clutch shipping lever 20 to move the member 15 longitudinally of the shaft in such a manner as alternatively to connect the clutch and release the brake, or disconnect the clutch and apply the brake.

Referring more particularly to the controlling mechanism for the member 20, it will be observed that this member is suitably pivotally mounted at a point between its ends on a longitudinally disposed pivot 21 on the frame, herein on that part of the frame carrying the stationary brake abutment 18. At its upper end, this member 20 is also provided with a pivoted sleeve 22 freely movable between adjustable wear-absorbing stops 23 threaded on the outer end of a threaded transversely disposed pivoted operating member or rod 24 which is in turn pivotally mounted at its inner end on a longitudinally disposed pin or extension 25 provided on a cam or eccentric 26 rotatably mounted on the frame. This member 26 is herein formed on a longitudinally extending rock shaft 27 journaled at 28 on the frame and having fixed thereto, as by a key 29, an upstanding controlling handle 30 movable in a transverse plane and operable from the side of the truck. As shown, the shaft 27 and its bearing 28 on the frame are carried on a longitudinally extending member 31 supported by the frame and having a laterally extending web 32 and a depending portion 33 fixed to a casing 34 surrounding the clutch and brake mechanism. As shown, the web 32, also preferably carries a shield, cover member or seat 35, the latter herein being suitably pivotally connected to the web as by a pin 36 in such a manner that the member 35 will normally cover the mechanism and form a satisfactory operator's seat near a side platform 37, and yet at the same time be free to be swung laterally as indicated in Fig. 1, to expose the controlled parts whenever desired.

In the use of my improved construction, the clutch and brake may be alternatively operated by swinging the upstanding lever 30 about its pivot to oscillate the eccentric 26 and its pin 25 and thereby move the member 15 and its connected movable clutch member 13. For example, in the full line position shown in Fig. 2 wherein the pin 25 is moved to the extreme right hand limit of its movement, the member 15 is pushed to the left and the member 13 thereby expanded in such a manner as to cause it to press against the clutch lining 12 and compress the latter against the clutch member 11, thereby connecting the clutch. To disconnect the clutch without applying the brake, the member 30 is moved to the right hand dotted line position shown in Fig. 2 and the full line position shown in Fig. 1. By this movement, the eccentric 26 is so rotated to the left as to move the member 15 sufficiently outward to make the member 13 disconnect the clutch and yet not connect with the brake member 18. When it is desired to apply the brake, however, the member 30 is then moved to the left hand dotted position shown in Fig. 2, the eccentric 26 then being further rotated to the extreme left hand limit of its movement in such a manner as to draw the rod 24 further to the left and thereby move the member 15 sufficiently far to cause the member 13 to press the brake lining 17 against the brake member 18.

Attention is directed to the fact that in the position of the parts shown in Fig. 2 the pivot pin 25 is in substantial alinement with the rock shaft 27 and so that an extremely powerful toggle action has been obtained. It will also be noted that as the handle 30 is moved toward the left hand dotted position the truck drive is first interrupted, then there is a period of lost motion, and that as the brake is applied the parts are moving into a position to obtain a toggle action once more.

The mechanism shown permits an operator to move a simple controlling member conveniently, quickly and freely from the right hand full line or driving position shown in Fig. 2 to the left hand dotted line or braking position shown in that figure, or vice versa, without any necessary interruption of movement, the action being such that the truck may be quickly disconnected from its power and braked when necessary or as quickly released from its brake and connected to its driving mechanism. Through the location of the member 30 at one side of the truck, it will also be observed that the member 30 may be readily moved by an operator seated on the seat 35, the latter conveniently located above the control mechanism on the end of the shaft 4 and adjacent the platform 37. When on this seat, it will also be noted that the operator is so located relative to the control member 30 that he is able to apply his maximum power to the latter and even also use his weight on the lever if necessary. Through the provision of the pivotal mounting for this seat, it will also be noted that whenever access is desired to the mechanism, the seat may be readily thrown out of operative position to permit such adjustment of the mechanism as may be desired.

While I have in this application specifically described one embodiment which my invention may assume in practice, it will be understood that this form of the same is for illustrative purposes and that the invention may be modified and embodied in various other forms without departing from the spirit or scope of the appended claims.

What I claim as new and desire to secure from Letters Patent is:

1. In combination, a plurality of control devices including a clutch device and a brake device, a member operative on movement in one direction to effect operation of one of said devices and on movement in the opposite direction to effect operation of the other of said devices, and means for effecting each of said movements with a toggle action.

2. In combination, a plurality of control devices including a clutch device and a brake device, a member operative on movement in one direction to effect operation of one of said devices and on movement in the opposite direction to effect operation of the other of said devices, and means including a manually operable handle movable in opposite directions to effect said different operations for effecting each of said movements with a toggle action.

3. In combination, a plurality of control devices including a clutch device and a brake device, and means for effecting operation of each of said devices including a manually operable controlling member, and toggle means actuated thereby for effecting operation of each of said devices.

4. In combination, a plurality of control devices including a clutch device and a brake device, and means for effecting operation of each of said devices including a manually operable controlling member, and unitary means for effecting operation of each of said devices with a toggle action.

5. In combination, a plurality of control devices including a clutch device and a brake device, a member operative on movement in one direction to effect operation of one of said devices and on movement in the opposite direction to effect operation of the other of said devices, one of said devices being frictionally controlled, actuating means for said devices including a manually operable controlling handle, and means for limiting to a predetermined amount the friction in said friction device.

6. In combination, a plurality of control devices including a clutch device and a brake device, a member operative on movement in one direction to effect operation of one of said devices and on movement in the opposite direction to effect operation of the other of said devices, one of said devices being frictionally controlled, actuating means for said devices including a manually operable controlling handle, and means for limiting to a predetermined amount the friction in said friction device including means adjustable to vary the amount of predetermined friction.

7. In combination, a plurality of control devices including a clutch device and a brake device, a member operative on movement in one direction to effect operation of one of said devices and on movement in the opposite direction to effect operation of the other of said devices, one of said devices being frictionally controlled, actuating means for said devices including a manually operable controlling handle, means for limiting to a predetermined amount the friction in said friction device during movement of said handle in one direction, and means whereby movement of the handle in the other direction releases said friction device and applies the other.

8. In combination, a plurality of control devices including a clutch device and a brake device, a member operative on movement in one direction to effect operation of one of said devices and on movement in the opposite direction to effect operation of the other of said devices, one of said devices being frictionally controlled, actuating means for said devices including a manually operable controlling handle, means for limiting to a predetermined amount the friction of said friction device during movement of said handle in one direction, and means whereby movement of the handle in the other direction releases said friction device and applies the other, said latter means having a neutral position between said operating positions to effect release of both of said devices.

9. In combination, in a truck driving and controlling mechanism, brake and clutch devices, a member operative on movement in one direction to effect operation of one of said devices and on movement in the opposite direction to effect operation of the other of said devices, and a toggle mechanism operative to effect said operations, a manually movable controlling handle, and means connecting said member and handle permitting actuation of said member through toggle mechanism on either movement thereof.

10. In combination, a truck driving and controlling mechanism, brake and clutch devices, a pivotally mounted controlling member, an operating member operative in opposite positions to effect operation of said brake and clutch devices, a member pivotally connected to said controlling member at a point offset from the pivot of the latter and operatively connectible with said operating member through a lost motion connection whereby said controlling member may be moved to bring said point of pivotal connection into substantial alinement with said connecting member when at either side of the pivot of said controlling member.

11. In combination, brake and clutch devices, a pivoted controlling handle therefor, and operative connections including an operating member having an eccentrically disposed crank pin and a pivoted shipper lever actuated thereby, said operating connections being disposed between said controlling member and said devices for connecting one device and disconnecting the other during movement of said handle in one direction.

12. In combination, brake and clutch devices, a pivoted controlling handle therefor, and operative connections between said handle and said devices including an eccentric actuated by said handle and relatively adjustable connected link and lever members actuated by said eccentric.

13. In combination, coaxial brake and clutch mechanisms including a longitudinally movable member, operatively connected actuating link and lever members for said member, and an actuating eccentric for said link and lever members.

14. In combination, brake and clutch devices, a pivotally mounted controlling member, an operating member operative in opposite positions to effect operation of said brake and clutch devices, and a toggle connection between said controlling member and said operating member.

15. In combination, brake and clutch devices, a pivotally mounted controlling member, an operating member operative in opposite positions to effect operation of said brake and clutch devices, and a combined lost motion and toggle connection between said controlling member and operating member.

16. In combination, brake and clutch devices, a pivotally mounted controlling member, an operating member operative in opposite positions to effect operation of said brake and clutch devices, and a member pivotally connected to said controlling member at a point off-set from the pivot of the latter and operatively connectible with said operating member, said controlling member being movable to bring said pivots into substantial alinement with said connecting member.

17. In combination, brake and clutch devices, a pivotally mounted controlling member, an operating member operative in opposite positions to effect operation of said brake and clutch devices, and a member pivotally connected to said controlling member at a point off-set from the pivot of the latter and having a lost motion connection with said operating member, said controlling member being movable to bring said pivots into substantial alinement with said connecting member.

In testimony whereof I affix my signature.

CHARLES W. WYMAN.